US012466041B2

(12) United States Patent
Kane et al.

(10) Patent No.: US 12,466,041 B2
(45) Date of Patent: Nov. 11, 2025

(54) WORKPIECE CONTACT ELEMENT FOR A POWERED FASTENER DRIVER

(71) Applicant: TECHTRONIC CORDLESS GP, Anderson, SC (US)

(72) Inventors: Adam Kane, Easley, SC (US); Justin Moylan, Easley, SC (US)

(73) Assignee: Techtronic Cordless GP, Anderson, SC (US)

( * ) Notice: Subject to any disclaimer, the term of this patent is extended or adjusted under 35 U.S.C. 154(b) by 34 days.

(21) Appl. No.: 18/406,617

(22) Filed: Jan. 8, 2024

(65) Prior Publication Data

US 2025/0222577 A1 Jul. 10, 2025

(51) Int. Cl.

*B25C 5/13* (2006.01)
*B25C 1/00* (2006.01)
*B25C 5/16* (2006.01)

(52) U.S. Cl.

CPC ................ *B25C 1/008* (2013.01); *B25C 5/13* (2013.01); *B25C 5/16* (2013.01)

(58) Field of Classification Search

CPC ............ B25C 1/00; B25C 1/188; B25C 1/008
USPC .............................................................. 227/8
See application file for complete search history.

(56) References Cited

U.S. PATENT DOCUMENTS 4,197,974 A 4/1980 Morton et al.
4,253,598 A 3/1981 Haytayan
4,375,867 A * 3/1983 Novak ...................... B25C 1/06 227/109
4,945,730 A * 8/1990 Laney ..................... B25C 1/008 60/632

(Continued)

FOREIGN PATENT DOCUMENTS

EP 1582310 A2 10/2005
EP 3578303 A1 12/2019

(Continued)

OTHER PUBLICATIONS

Ryobi, image illustrating a workpiece contact element for the Ryobi One+ HP 18V 18 Ga Brushless Cordless AirStrike Brad Nailer (Model No. P322), publicly available prior to Jan. 8, 2024 (1 page).

(Continued)

*Primary Examiner* — Praachi M Pathak
(74) *Attorney, Agent, or Firm* — Michael Best & Friedrich LLP

(57) ABSTRACT

A workpiece contact element for a fastener driver includes a body defining a fastener receiving region through which fasteners are fed from a magazine of the fastener driver. The body having a base surface parallel with a fastener driving axis of the fastener driver. The workpiece contact element also includes a fastener guiding portion disposed forward of the fastener receiving region and extending in a direction of the fastener driving axis and a tip retainer includes a longitudinal protrusion and a pair of opposed lateral protrusions. The longitudinal protrusion extends from a forwardmost end of the body, and the opposed lateral protrusions are position on opposite lateral sides of the body adjacent the forwardmost end. The fastener guiding portion includes a platform extending above the base surface of the body and spaced rearwardly from the forwardmost end of the body.

20 Claims, 7 Drawing Sheets

(56) References Cited

U.S. PATENT DOCUMENTS

| | | | | |
|---|---|---|---|---|
| 5,816,469 | A | 10/1998 | Ohuchi | |
| 5,833,420 | A * | 11/1998 | Schmidle | E04B 1/7633 411/533 |
| 6,273,316 | B1 | 8/2001 | Losada | |
| 6,481,611 | B2 | 11/2002 | Losada | |
| 6,494,355 | B2 | 12/2002 | Adachi et al. | |
| 6,578,750 | B2 | 6/2003 | Kubo et al. | |
| 6,651,862 | B2 | 11/2003 | Driscoll et al. | |
| 6,708,821 | B2 | 3/2004 | Tucker et al. | |
| 6,783,044 | B2 | 8/2004 | Perra et al. | |
| 6,786,380 | B2 | 9/2004 | Driscoll et al. | |
| 6,862,963 | B2 | 3/2005 | Habermehl et al. | |
| 6,866,177 | B1 | 3/2005 | Chen | |
| 6,892,922 | B2 | 5/2005 | Tucker et al. | |
| 7,004,368 | B1 | 2/2006 | Chen | |
| 7,111,767 | B2 | 9/2006 | Losada | |
| 7,213,732 | B2 | 5/2007 | Schell et al. | |
| 7,325,709 | B2 | 2/2008 | Ishizawa et al. | |
| 7,328,826 | B2 | 2/2008 | Shkolnikov | |
| 7,431,103 | B2 | 10/2008 | Schell et al. | |
| RE41,265 | E | 4/2010 | Perra et al. | |
| 7,726,536 | B2 | 6/2010 | Gross et al. | |
| 7,845,530 | B2 | 12/2010 | Schell et al. | |
| 7,870,987 | B1 | 1/2011 | Zhang et al. | |
| 8,123,099 | B2 | 2/2012 | Kenney et al. | |
| 8,733,608 | B2 | 5/2014 | Segura et al. | |
| 9,469,021 | B2 | 10/2016 | Gregory et al. | |
| 9,486,904 | B2 | 11/2016 | Gregory et al. | |
| 9,498,871 | B2 | 11/2016 | Gregory et al. | |
| 9,527,196 | B2 | 12/2016 | Segura | |
| 9,643,305 | B2 | 5/2017 | Gregory et al. | |
| 9,649,755 | B2 | 5/2017 | Gregory et al. | |
| 9,827,658 | B2 | 11/2017 | Gregory et al. | |
| 10,144,120 | B2 | 12/2018 | Segura | |
| 10,723,037 | B2 | 7/2020 | Hung et al. | |
| 10,836,024 | B2 * | 11/2020 | Young | B25C 5/06 |
| 10,888,981 | B2 * | 1/2021 | Gregory | B25C 1/001 |
| 11,065,748 | B2 | 7/2021 | Hung et al. | |
| 11,260,512 | B2 * | 3/2022 | Zimmerman | B25C 1/008 |
| 2003/0116604 | A1 | 6/2003 | Driscoll et al. | |
| 2005/0150927 | A1 * | 7/2005 | Tadayoshi | B25C 1/188 227/120 |
| 2006/0091176 | A1 | 5/2006 | Cannaliato et al. | |
| 2006/0191971 | A1 | 8/2006 | Li | |
| 2013/0320063 | A1 | 12/2013 | Gregory et al. | |
| 2013/0320064 | A1 | 12/2013 | Gregory et al. | |
| 2015/0096776 | A1 * | 4/2015 | Garber | B25C 1/00 173/1 |
| 2018/0050445 | A1 * | 2/2018 | Po | B25C 1/047 |
| 2018/0071904 | A1 | 3/2018 | Gregory et al. | |
| 2018/0085904 | A1 | 3/2018 | Gregory et al. | |
| 2018/0099400 | A1 * | 4/2018 | Wong | B25C 1/188 |
| 2020/0406438 | A1 * | 12/2020 | Uchiyama | B25C 7/00 |
| 2023/0302618 | A1 | 9/2023 | Nettleton et al. | |
| 2024/0131674 | A1 * | 4/2024 | Garces | B25C 1/06 |
| 2024/0157531 | A1 * | 5/2024 | Zhao | B25C 1/008 |
| 2024/0300081 | A1 * | 9/2024 | Baba | B25C 1/184 |

FOREIGN PATENT DOCUMENTS

| | | | | |
|---|---|---|---|---|
| GB | 1542841 | A | 3/1979 | |
| JP | S61178677 | U | 11/1986 | |
| JP | H0585571 | U | 11/1993 | |
| JP | 3275529 | B2 | 4/2002 | |
| JP | 3518568 | B2 | 4/2004 | |
| JP | 4525585 | B2 | 8/2010 | |
| JP | 4827026 | B2 | 11/2011 | |
| JP | 5208631 | B2 | 6/2013 | |
| JP | 2015047652 | A | 3/2015 | |
| JP | 6162038 | B2 | 7/2017 | |
| WO | WO-2008147666 | A1 * | 12/2008 | B25C 7/00 |

OTHER PUBLICATIONS

Ridgid, image illustrating a workpiece contact element for the Ridgid Brushless Cordless 18 Ga 2-1/8 inch Brad Nailer (Model No. R09891), publicly available prior to Jan. 8, 2024 (1 page).

Ridgid, image illustrating a workpiece contact element for the Ridgid Pneumatic 18 Ga 2-1/8 inch Brad Nailer (Model No. R213BNF), publicly available prior to Jan. 8, 2024 (1 page).

Ridgid, images illustrating a workpiece contact element for the Ridgid Pneumatic 15 Ga 2-1/2 inch Angled Finish Nailer (Model No. R250AFF), publicly available prior to Jan. 8, 2024 (1 page).

Ridgid, images illustrating a workpiece contact element for the Ridgid Pneumatic 16 Ga 2-1/2 inch Straight Finish Nailer (Model No. R250SFF), publicly available prior to Jan. 8, 2024 (1 page).

Milwaukee Tool, image illustrating a workpiece contact element for the Milwaukee Tool M18 Fuel 16 Ga Straight Finish Nailer (Model No. 3020-20), publicly available prior to Jan. 8, 2024 (1 page).

Milwaukee Tool, image illustrating a workpiece contact element for the Milwaukee Tool M18 Fuel 16 Ga Angled Finish Nailer (Model No. 2841-20), publicly available prior to Jan. 8, 2024 (1 page).

Milwaukee Tool, image illustrating a workpiece contact element for the Milwaukee Tool M18 Fuel 15 Ga Angled Finish Nailer (Model No. 2839-20), publicly available prior to Jan. 8, 2024 (1 page).

Extended European Search Report for Application No. 24220976.5 dated Jul. 4, 2025 (9 pages).

* cited by examiner

WORKPIECE CONTACT ELEMENT FOR A POWERED FASTENER DRIVER

FIELD OF THE DISCLOSURE

The present invention relates to powered fastener drivers, and more specifically to safety mechanisms for powered fastener drivers.

BACKGROUND OF THE DISCLOSURE

There are various fastener drivers known in the art for driving fasteners (e.g., nails, tacks, staples, etc.) into a workpiece. These fastener drivers may include safety mechanisms to ensure that a fastener is driven only when the fastener driver is in contact with a workpiece.

SUMMARY OF THE DISCLOSURE

The present disclosure provides, in one aspect, a workpiece contact element for a fastener driver. The workpiece contact element includes a body defining a fastener receiving region through which fasteners are fed from a magazine of the fastener driver. The body having a base surface parallel with a fastener driving axis of the fastener driver. The workpiece contact element also includes a fastener guiding portion disposed forward of the fastener receiving region and extending in a direction of the fastener driving axis and a tip retainer includes a longitudinal protrusion and a pair of opposed lateral protrusions. The longitudinal protrusion extends from a forwardmost end of the body, and the opposed lateral protrusions are position on opposite lateral sides of the body adjacent the forwardmost end. The fastener guiding portion includes a platform extending above the base surface of the body and spaced rearwardly from the forwardmost end of the body.

The present disclosure provides, in another aspect, a workpiece contact element for a fastener driver. The workpiece contact element includes a fastener receiving region through which fasteners are fed from a magazine of the fastener driver. The body has a base surface parallel with a fastener driving axis of the fastener driver. The workpiece contact element also includes a fastener guiding portion disposed forward of the fastener receiving region and extending in a direction of the fastener driving axis. The fastener guiding portion includes a ramp surface and a guide surface contiguous with the ramp surface and disposed forward of the ramp surface. A top retainer including a longitudinal protrusion and a pair of opposed lateral protrusions. The longitudinal protrusion extends from a forwardmost end of the body, and the opposed lateral protrusions are positioned on opposite lateral sides of the body adjacent the forwardmost end. The guide surface is spaced rearward of the tip retainer with the base surface of the body extending between the guide surface and the tip retainer.

The present disclosure provides, in yet another aspect, a gas spring-powered fastener driver including an inner cylinder, a movable piston disposed within the inner cylinder for reciprocation therein between a top-dead-center (TDC) position and a bottom-dead-center (BDC) position, a driver blade coupled to the piston and movable therewith, the driver blade configured to drive a fastener along a fastener driving axis and into a workpiece during a fastener driving cycle, an electronic control unit configured to control actuation of the fastener driving cycle, a trigger mechanism actuatable by a user to provide a first input signal to the electronic control unit, and a safety mechanism including a workpiece contact element and a switch. The workpiece contact element is configured to actuate the switch to provide a second input signal to the electronic control unit. The electronic control unit initiates a fastener driving cycle upon receipt of the first input signal and the second input signal. The workpiece contact element includes a body having a base surface parallel with the fastener driving axis, a fastener guiding platform extending above the base surface, and a tip retainer extending forwardly from a forwardmost end of the body and offset below the base surface. The fastener guiding platform is spaced rearwardly of the forwardmost end of the body such that the base surface extends forward of the fastener guiding platform.

Other features and aspects of the disclosure will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
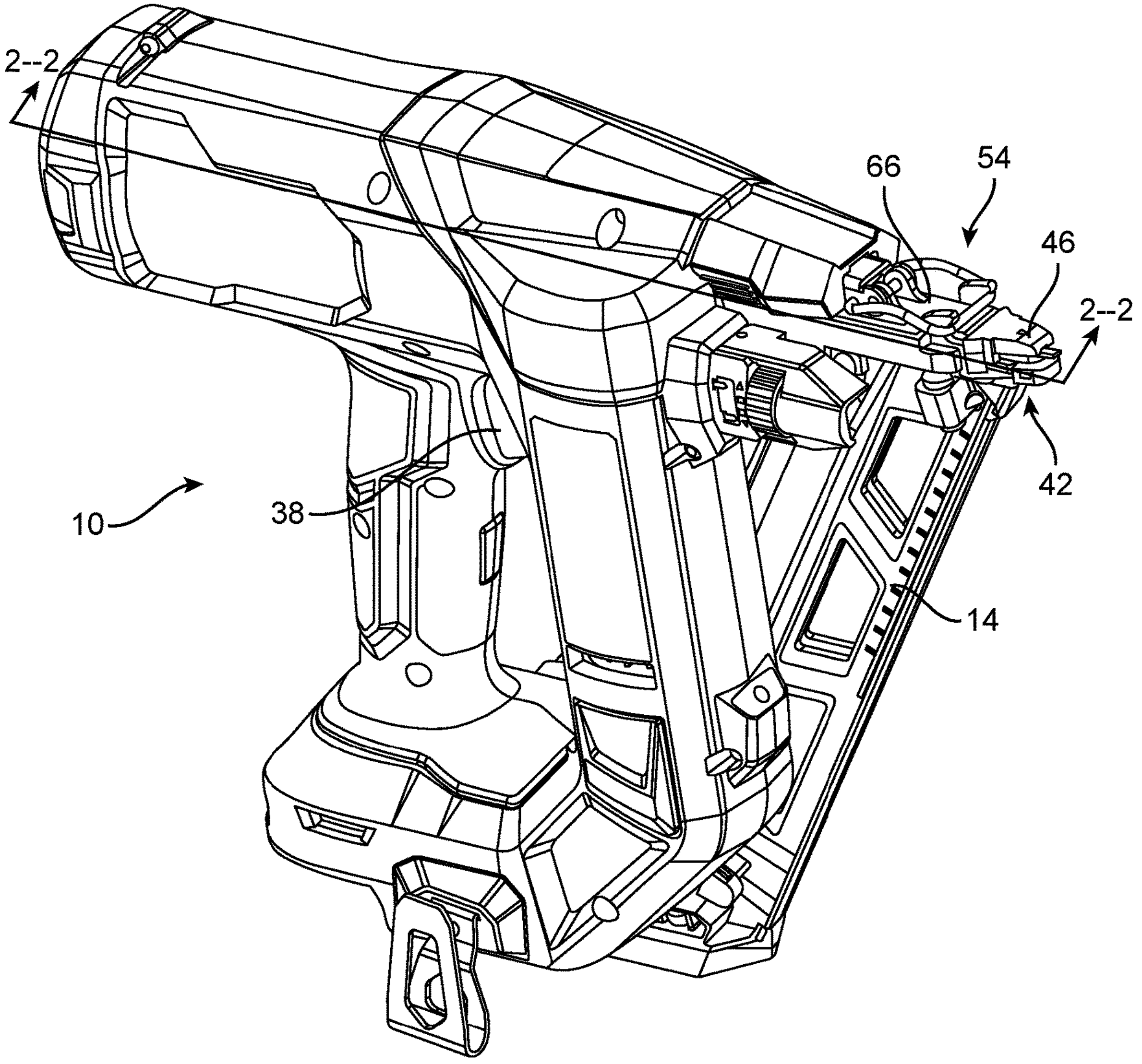
FIG. 1 is perspective view of a powered fastener driver in accordance with an embodiment of the present disclosure.
Figure 2:
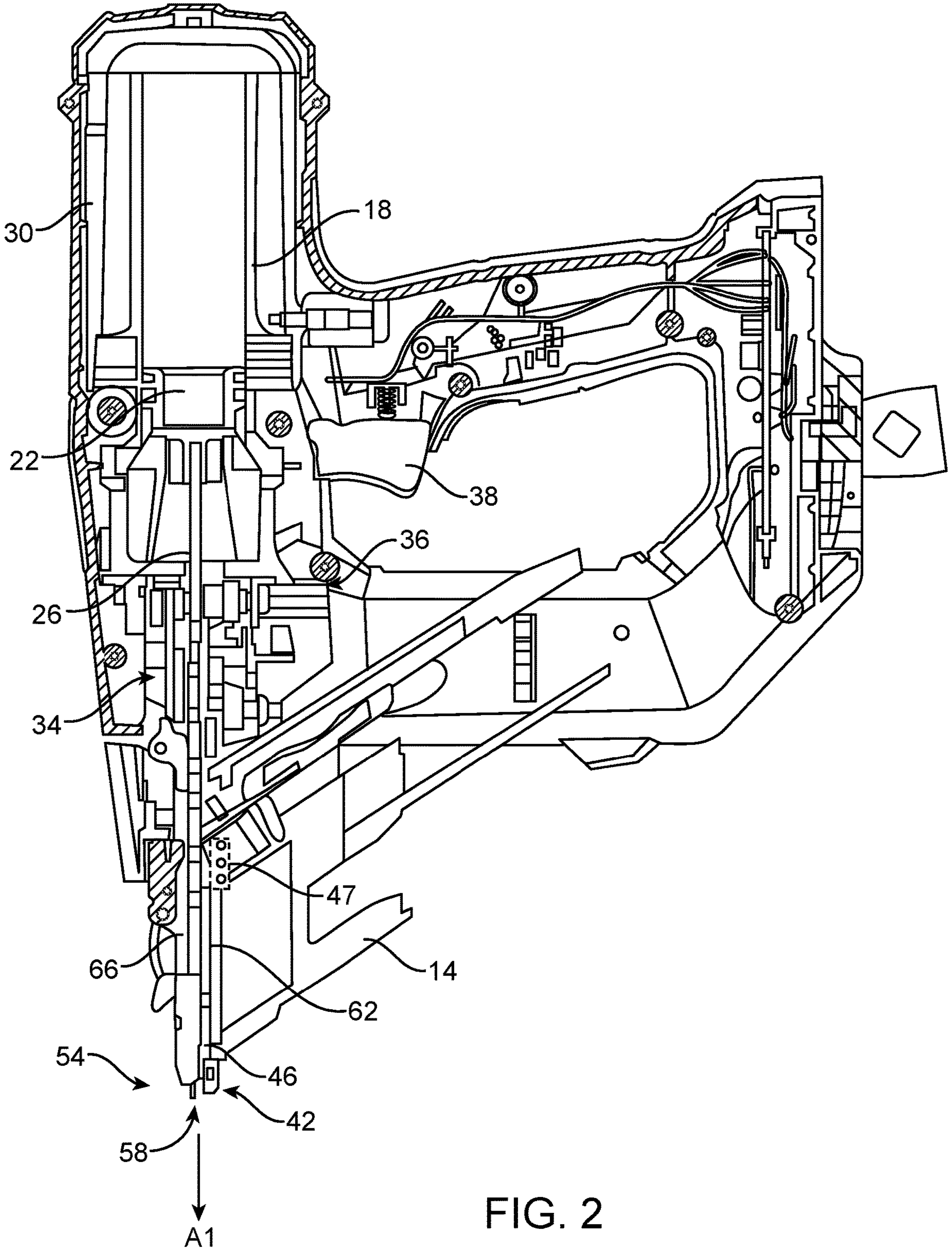
FIG. 2 is a cross-sectional view of the powered fastener driver of FIG. 1, taken along section 2-2 in FIG. 1.
Figure 3:
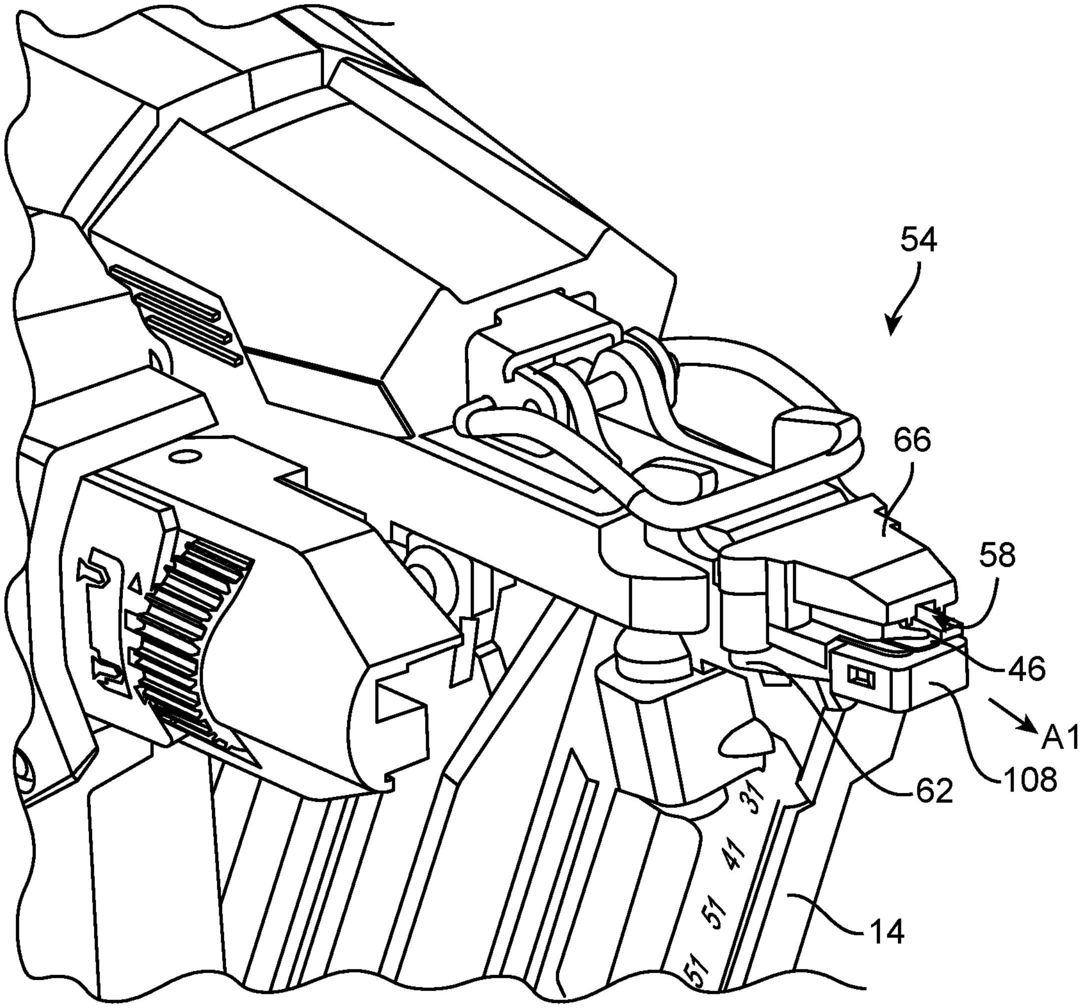
FIG. 3 is an enlarged view of a nosepiece and a workpiece contact element of the powered fastener driver of FIG. 1.

FIGS. 1-3 illustrate a powered fastener driver 10 operable to drive fasteners (e.g., nails, tacks, staples, etc.) held within a magazine 14 into a workpiece (not shown). The fastener driver 10 of the illustrated embodiment is a gas spring-powered fastener driver including an inner cylinder 18 and a movable piston 22 positioned within the inner cylinder 18. The fastener driver 10 further includes a driver blade 26 that is attached to the piston 22 and moveable therewith. The fastener driver 10 of the illustrated embodiment does not require an external source of air pressure, but rather includes an outer storage chamber cylinder 30 of pressurized gas in fluid communication with the cylinder 18. In other embodiments, the fastener driver 10 may implement an external source of air pressure for moving the piston 22 within the cylinder 18 as will be understood by one of ordinary skill in the art. In the illustrated embodiment, the cylinder 18 and the movable piston 22 are positioned within the outer storage chamber cylinder 30. The movable piston 22 reciprocates within the cylinder 18 between a top-dead-center (TDC) position and a bottom-dead-center (BDC) position, and a lifting mechanism 34 is operably coupled to the driver blade 26 to return the piston 22 from the BDC position toward the TDC position using torque provided by a drive unit 36 (e.g., a brushless direct current electric motor and gear train).

In operation, the lifting mechanism 34 moves the driver blade 26 and the piston 22 toward the TDC position, thus compressing a gas disposed within the outer storage chamber cylinder 30 and the inner cylinder 18. When a trigger mechanism 38 is actuated by a user, the driver blade 26 moves toward the BDC position due to the force on the piston 22 by the compressed gas. Movement of the piston 22 and the driver blade 26 toward the BDC position drives a fastener (not shown) into the workpiece. The trigger mechanism 38 is electrically connected to an electronic control unit (not shown) of the fastener driver 10. When the trigger mechanism 38 is actuated by a user, an input signal is provided to the electronic control unit indicating that the user intends to drive a fastener. The fastener driver 10 further includes a safety mechanism 42 that prevents inadvertent driving of the fastener. The safety mechanism 42 includes a workpiece contact element 46 and a switch 47 that is electrically connected to the electronic control unit. As will be described in greater detail herein, the electronic control unit does not drive a fastener unless input signals have been received from both the trigger mechanism 38 and the safety mechanism 42.

With reference to FIG. 3, the fastener driver 10 includes a nosepiece 54 positioned adjacent the magazine 14 and below the cylinder 18 (FIG. 2). As will be described in greater detail herein, a portion of the nosepiece 54 and the workpiece contact element 46 collectively define a fastener driving channel, or a firing channel 58, through which individual fasteners from the magazine 14 are discharged into a workpiece. In particular, the nosepiece 54 includes a base portion 62 operably coupled to the magazine 14 to receive fasteners from the magazine 14. The workpiece contact element 46 is coupled to the base portion 62 and slidable relative to the base portion 62. More particularly, the workpiece contact element 46 is slidable in a direction parallel to a fastener driving axis A1 (i.e., parallel to a movement direction of the driver blade 26), and at least a portion of the workpiece contact element 46 extends beyond the base portion 62 to contact a workpiece. The firing channel 58 is coaxial with the fastener driving axis A1. A biasing member (not shown) biases the workpiece contact element 46 toward an extended position, in which activation of the drive unit 36 (and thus initiation of a new fastener driving cycle) is prevented. Contact with the workpiece slides the workpiece contact element 46 toward a retracted position to actuate the switch of the safety mechanism 42 to provide the input signal to the electronic control unit. A cover portion 66 is rotatably coupled to the base portion 62 to define an upper portion of the firing channel 58, and the workpiece contact element 46 is disposed between the base portion 62 and the cover portion 66. Thus, the firing channel 58 is defined between the cover portion 66 of the nosepiece 54 and the workpiece contact element 46.

The fastener driver 10 is operable in either a sequential firing more or a bump-fire mode. To drive a fastener using the sequential firing mode, a user places the workpiece contact element 46 in contact with a workpiece, thus displacing the workpiece contact element 46 to the retracted position to actuate the safety mechanism switch, which provides an input signal to the electronic control unit. The user then actuates the trigger mechanism 38, which provides an input signal to the electronic control unit to drive the fastener. The electronic control unit allows the driver blade 26 to drive the fastener when input signals have been received from both the switch of the safety mechanism 42 and the trigger mechanism 38 in the order described above. To drive a fastener using the bump-fire mode, the electronic control unit must also receive an input signal from both the switch of the safety mechanism 42 and the trigger mechanism 38. However, the order in which the input signals are received does not matter in the bump-fire mode.

Figure 4:
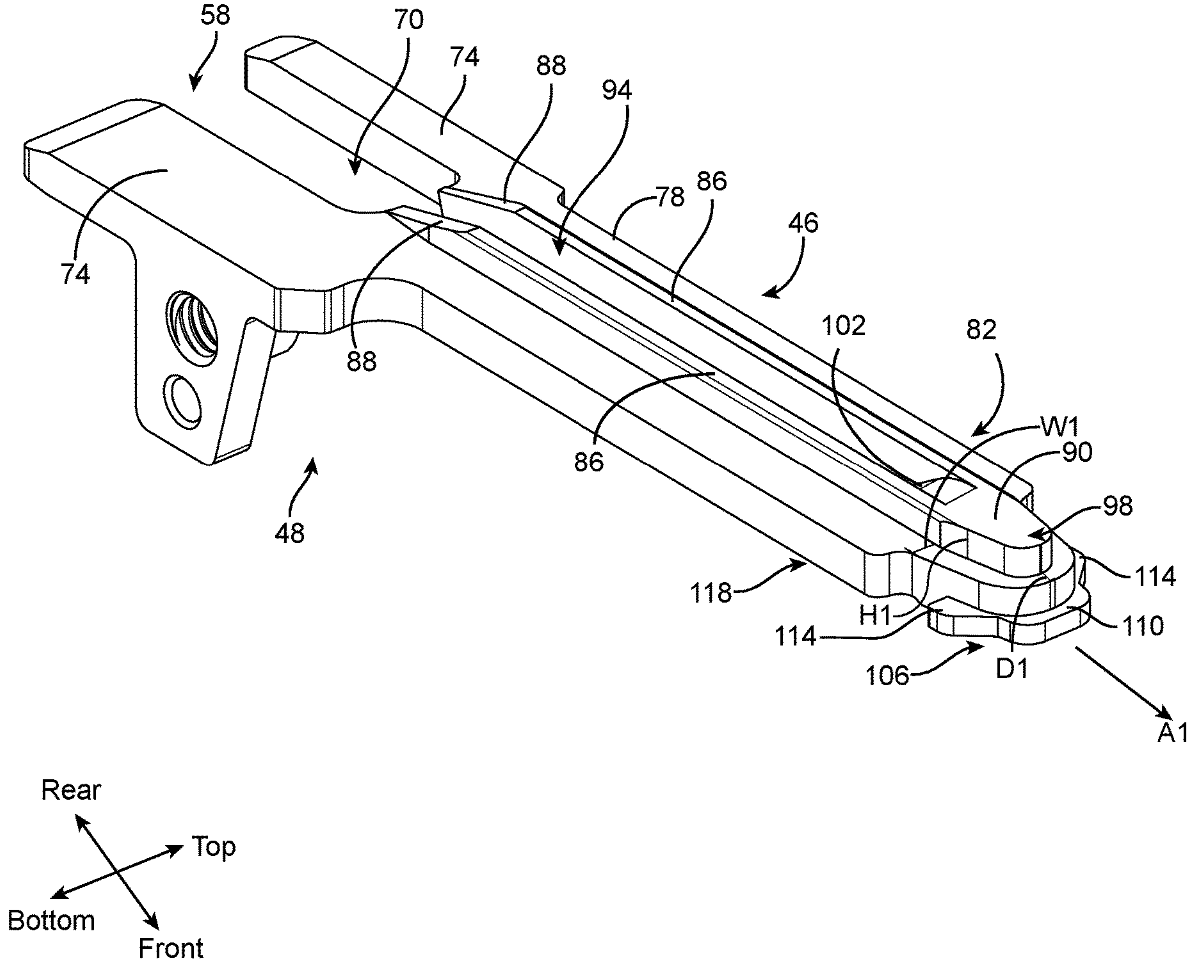
FIG. 4 is a perspective view of the workpiece contact element of FIG. 3 in accordance with an embodiment of the present disclosure.
Figure 5:
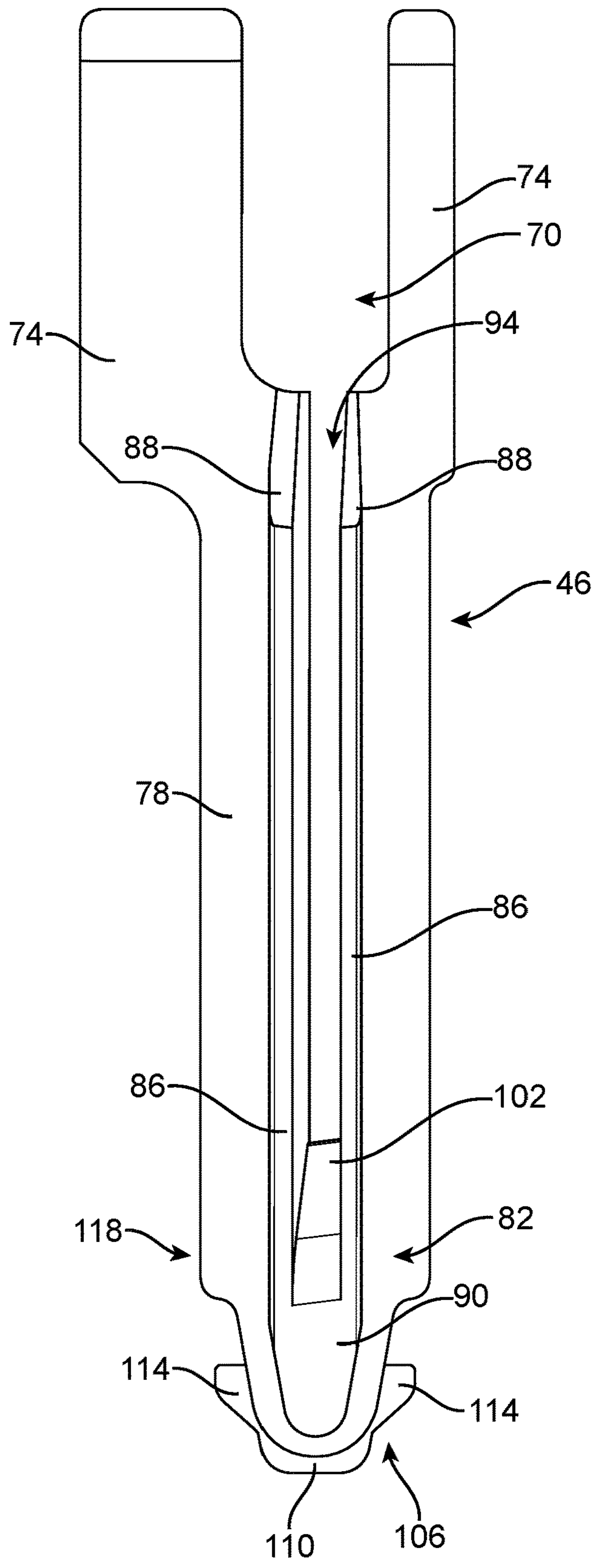
FIG. 5 is a top view of the workpiece contact element of FIG. 4

FIGS. 4 and 5 illustrate the workpiece contact element 46 in detail. The workpiece contact element 46 includes a body 48 defining a fastener receiving region 70 defined between opposed rearwardly extending arm portions 74 of the workpiece contact element 46. In operation, fasteners from the magazine 14 are fed through the fastener receiving region 70 and into the firing channel 58. The workpiece contact element 46 includes a base surface 78 that extends over the arm portions 74 and that extends parallel to the driving axis A1. The workpiece contact element 46 also includes a fastener guiding portion to aid in directing a fastener as the fastener is driven. The fastener guiding portion 82 includes a pair of guide ribs 86 that extend forward of the fastener receiving region 70 and a guide surface 90 contiguous with the guide ribs 86. In the illustrated embodiment, rearward ends 88 of each of the guide ribs 86 are tapered toward the base surface 78 of the workpiece contact element 46. A channel 94 is formed between the pair of guide ribs 86 rearward of the guide surface 90. The channel 94 is in communication with the fastener receiving region 70, and a portion of the fastener passes through the channel 94 as the fastener is fed from the magazine 14 into the firing channel 58. A fastener (not shown) may include a head, a shank extending from the head, and a tip at the distal end of the shank, as will be understood by one of ordinary skill in the art. When a fastener is fed from the magazine 14, the head and a substantial portion of the shank are received within the fastener receiving region 70, while the tip is received within the channel 94.

In the illustrated embodiment, the guide ribs 86 extend forward of (e.g., transverse to) the base surface 78 of the workpiece contact element 46. The guide ribs 86 and the guide surface 90 together form a fastener guiding platform 98 operable to direct fasteners as they are discharged from the firing channel 58 by the driver blade 26 into the workpiece, during which the platform 98 functions as a wear surface. The guide surface 90 also functions as an extension of the firing channel 58 to increase accuracy of the fastener driver 10. In the illustrated embodiment, the fastener guiding platform 98 further includes a ramp surface 102 disposed between the guide ribs 86 and operable to guide the fastener from a position within the firing channel 58 to a position on top of the fastener guiding platform 98. More particularly, as a fastener is driven, the ramp surface 102 pushes the tip of the fastener forwardly (i.e., transverse to the driving axis A1) to ensure that the fastener remains colinear with the firing channel 58 during the fastener driving cycle. The fastener guiding platform 98 is spaced rearwardly from a forwardmost portion of the workpiece contact element 46. In the illustrated embodiment, the fastener guiding platform 98 tapers inwards towards the driving axis A1 adjacent a forwardmost portion of the workpiece contact element 46.

In the illustrated embodiment, the workpiece contact element 46 further includes a tip retainer 106 disposed forward of the fastener guiding platform 98. The tip retainer 106 supports a no-mar tip 108 relative to the workpiece contact element 46, and the no-mar tip 108 is engageable with the workpiece during operation of the fastener driver 10. The no-mar tip 108 is made from a softer material than the workpiece, ensuring that any wear between the tip 108 and the workpiece will occur on the tip 108. The tip retainer 106 includes a longitudinal protrusion 110 and a pair of opposed lateral protrusions 114 that together support the no-mar tip 108. The tip retainer 106 of the illustrated embodiment is offset from the base surface 78 of the workpiece contact element 46 in a direction transverse to axis A1 so as not to interfere with driving of the fastener. In the illustrated embodiment, the tip retainer 106 is offset below the base surface 78.

In the illustrated embodiment, the fastener guiding platform 98 extends a height H1 above the base surface 78 of the workpiece contact element 46. The fastener guiding platform 98 is also positioned a distance D1 rearwards of the forwardmost end of the workpiece contact element 46. The guide ribs 86 are oriented generally parallel to opposite sides 118 of the workpiece contact element 46 and to a movement direction of the workpiece contact element 46 (e.g., to the driving axis A1), and are spaced inward from the opposite sides 118 of the workpiece contact element 46 by a width W1. As such, the base surface 78 extends around the distal (i.e., forwardmost) end of the platform 98, making the platform 98 discontinuous with the tip retainer 106. The height H1 may be between 1.5 mm and 2.5 mm, and, more particularly, is 1.8 mm in the illustrated embodiment. The distance D1 is greater than 0.5 mm and, more particularly, is at least 1 mm in the illustrated embodiment. Finally, the width W1 is greater than 0.5 mm, and, more particularly, is at least 1.5 mm in the illustrated embodiment.

Figure 6:
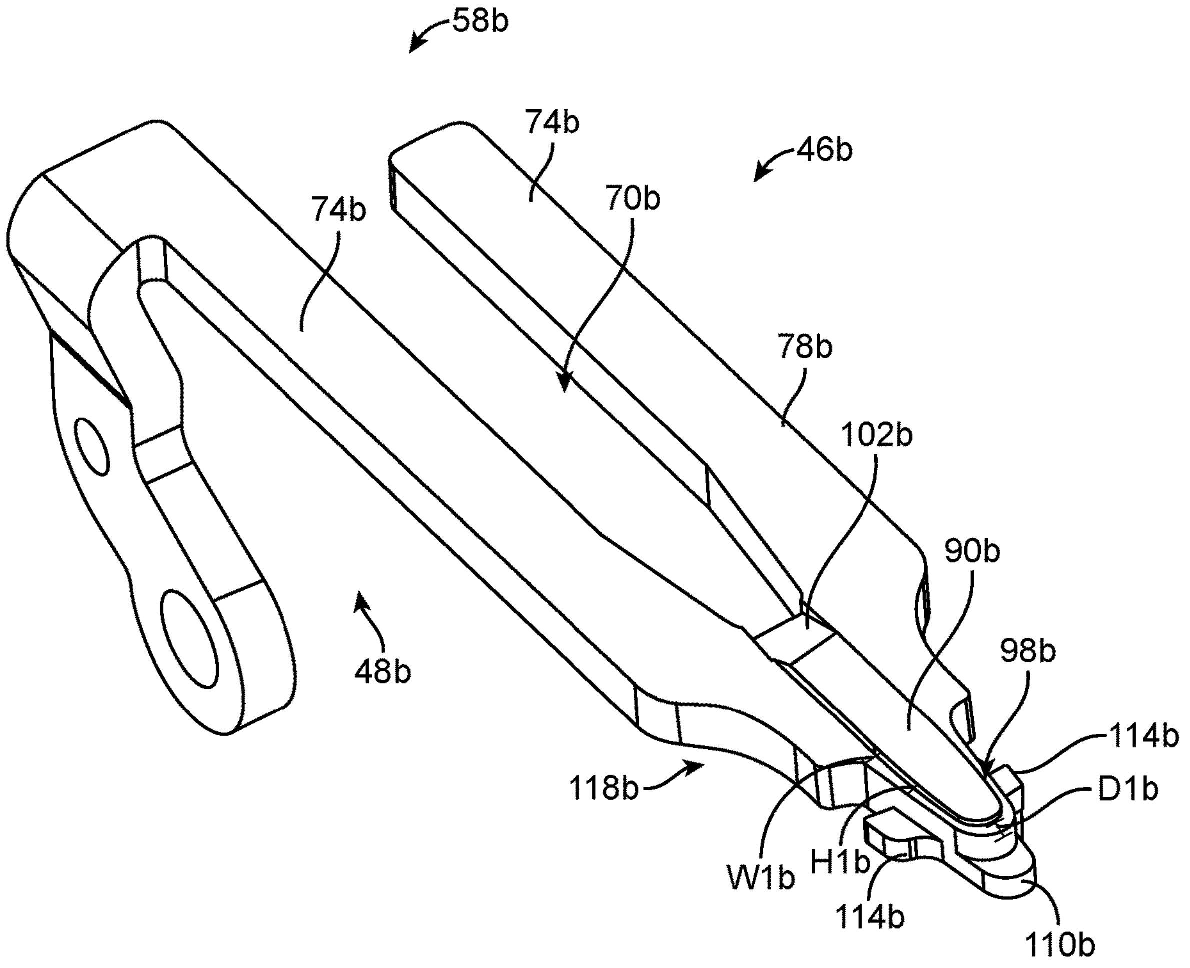
FIG. 6 is a perspective view of a workpiece contact element in accordance with another embodiment of the present disclosure, for use with the powered fastener driver of FIG. 1.
Figure 7:
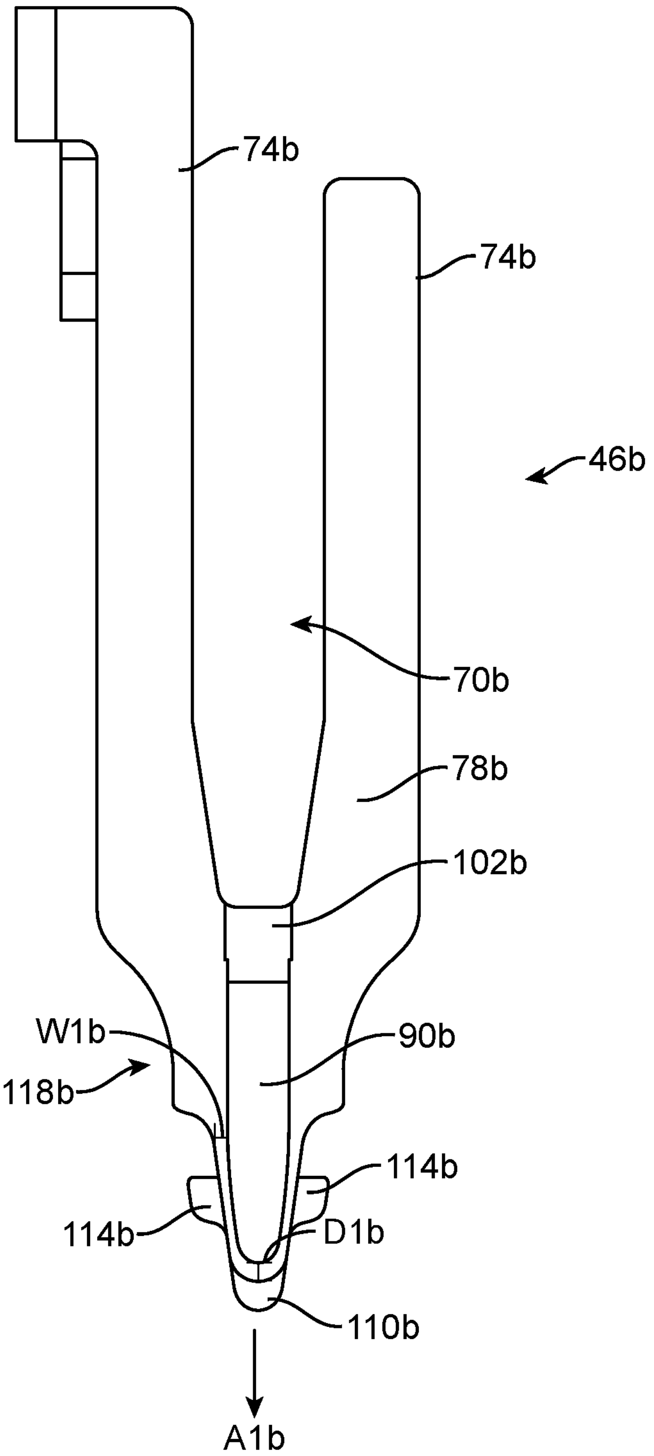
FIG. 7 is a top view of the workpiece contact element of FIG. 6.

FIGS. 6 and 7 illustrate a workpiece contact element **46*b* according to another embodiment of the present disclosure, with like parts having like reference numerals plus the letter "b" appended thereon and the following differences explained below. Unlike the previously described workpiece contact element 46, the fastener guiding platform 98*b* does not include guide ribs defining a channel. The fastener guiding platform 98*b* includes a ramp surface 102*b* extending from the fastener receiving region 70*b* and a guide surface 90*b* extending from the ramp surface 102*b*. In the embodiment of FIGS. 6 and 7, the entire fastener passes through the fastener receiving portion 70*b* as the fastener passes from the magazine 14*b* to the firing channel 58*b*. The guide surface 90*b* is oriented parallel to a base surface 78*b* of the workpiece contact element 46*b* and extends a height H1*b* above the base surface 78*b*. The height H1*b*** is greater than 0.1 mm and, more particularly, is at least 0.3 mm in the illustrated embodiment.

Like the previously disclosed workpiece contact element 46, the fastener guiding platform **98*b* is spaced rearwardly from a forwardmost portion of the workpiece contact element 46*b* by a distance D1*b*. The distance D1*b* is greater than 0.5 mm and, more particularly, is at least 1 mm in the illustrated embodiment. As such, the base surface 78*b* extends around the distal (i.e., forwardmost) end of the platform 98, making the platform 98 discontinuous with the tip retainer 106. The fastener guiding platform 98*b* is spaced inwardly from opposed sides 118*b* of the workpiece contact element 46*b* by a width W1*b*. The width W1*b* is greater than 0.3 mm and, more particularly, is at least 0.5 mm in the illustrated embodiment. Again, like the previously disclosed workpiece contact element 46, the fastener guiding platform 98*b* tapers along the driving axis Alb, and the tip retainer 16*b* has a longitudinal protrusion 110*b* and a pair of opposed lateral protrusions 114*b*** supports a no-mar tip (not shown).

Various features of the invention are set forth in the following claims.

What is claimed is:

1. A workpiece contact element for a fastener driver, the workpiece contact element comprising:

a body defining a fastener receiving region through which fasteners are fed from a magazine of the fastener driver, the body having a base surface parallel with a fastener driving axis of the fastener driver;

a fastener guiding portion disposed forward of the fastener receiving region and extending in a direction of the fastener driving axis; and a tip retainer including a longitudinal protrusion and a pair of opposed lateral protrusions, the longitudinal protrusion extending from a forwardmost end of the body, and the opposed lateral protrusions being positioned on opposite lateral sides of the body adjacent the forwardmost end, wherein the fastener guiding portion includes a platform extending above the base surface of the body and spaced rearwardly from the forwardmost end of the body.

2. The workpiece contact element of claim 1, wherein the fastener guiding portion includes a pair of opposed guide ribs extending from the base surface, and wherein the guide ribs define a channel therebetween through which fasteners are fed from the magazine.

3. The workpiece contact element of claim 2, wherein the fastener guiding portion includes a guide surface contiguous with the guide ribs at a front portion thereof, and wherein the guide surface defines a portion of a fastener driving channel coaxial with the fastener driving axis.

4. The workpiece contact element of claim 3, wherein the fastener guiding portion includes a ramp surface disposed between the channel and the guide surface, and wherein the ramp surface is configured to direct a tip portion of the fasteners onto the guide surface.

5. The workpiece contact element of claim 4, wherein the platform is spaced rearwardly of the forwardmost end of the body by a distance of at least 0.5 mm.

6. The workpiece contact element of claim 5, wherein the platform is spaced rearwardly of the forwardmost end of the body by a distance of 1 mm.

7. The workpiece contact element of claim 1, wherein the tip retainer is spaced below the base surface of the body.

8. A workpiece contact element for a fastener driver, the workpiece contact element comprising:

a body defining a fastener receiving region through which fasteners are fed from a magazine of the fastener driver, the body having a base surface parallel with a fastener driving axis of the fastener driver;

a fastener guiding portion disposed forward of the fastener receiving region and extending in a direction of the fastener driving axis, the fastener guiding portion including a ramp surface, and a guide surface contiguous with the ramp surface and disposed forward of the ramp surface; and a tip retainer including a longitudinal protrusion and a pair of opposed lateral protrusions, the longitudinal protrusion extending from a forwardmost end of the body, and the opposed lateral protrusions being positioned on opposite lateral sides of the body adjacent the forwardmost end, wherein the guide surface is spaced rearward of the tip retainer with the base surface of the body extending between the guide surface and the tip retainer.

9. The workpiece contact element of claim 8, wherein the guide surface is oriented parallel to the base surface.

10. The workpiece contact element of claim 8, wherein the guide surface is spaced rearwardly from the forwardmost end of the body by a distance of at least 1 mm.

11. The workpiece contact element of claim 8, wherein the fastener guiding portion extends above the base surface.

12. The workpiece contact element of claim 11, wherein the fastener guiding portion extends above the base surface by a height of at least 0.3 mm.

13. The workpiece contact element of claim 8, wherein the fastener guiding portion tapers inwards toward the fastener driving axis.

14. The workpiece contact element of claim 8, further comprising a no-mar tip coupled to the tip retainer, the no-mar tip configured to contact a workpiece when the workpiece contact element is pressed against the workpiece.

15. The workpiece contact element of claim 8, wherein the guide surface is spaced inwardly from opposite sides of the body, at a location near the tip retainer, by a width of at least 0.5 mm.

16. A gas spring-powered fastener driver comprising:

an inner cylinder;

a movable piston disposed within the inner cylinder for reciprocation therein between a top-dead-center (TDC) position and a bottom-dead-center (BDC) position;

a driver blade coupled to the piston and movable there-with, the driver blade configured to drive a fastener along a fastener driving axis and into a workpiece during a fastener driving cycle;

an electronic control unit configured control actuation of the fastener driving cycle;

a trigger mechanism actuatable by a user to provide a first input signal to the electronic control unit; and a safety mechanism including a workpiece contact element and a switch, the workpiece contact element configured to actuate the switch to provide a second input signal to the electronic control unit, wherein the electronic control unit initiates a fastener driving cycle upon receipt of the first input signal and the second input signal, and wherein the workpiece contact element includes a body having a base surface parallel with the fastener driving axis, a fastener guiding platform extending above the base surface, the fastener guiding platform being spaced rearwardly of a forwardmost end of the body such that the base surface extends forward of the fastener guiding platform, and a tip retainer extending forwardly from the forwardmost end of the body and offset below the base surface.

17. The gas spring-powered fastener driver of claim 16, wherein the workpiece contact element further includes a pair of guide ribs defining a channel therebetween and configured to direct the fastener when the fastener is driven into the workpiece.

18. The gas spring-powered fastener driver of claim 16, wherein the workpiece contact element is slidable between an extended position in which the switch does not send the second input signal to the electronic control unit, and a retracted position in which the workpiece contact element actuates the switch to send the second input signal to the electronic control unit.

19. The gas spring-powered fastener driver of claim 16, wherein the fastener guiding platform extends above the base surface by a height of at least 1.8 mm.

20. The gas spring-powered fastener driver of claim 19, wherein the fastener guiding platform is spaced rearwardly of the forwardmost end of the body by a distance of at least 1 mm.

* * * * *